United States Patent [19]

Beckman, Jr.

[11] 4,002,252
[45] Jan. 11, 1977

[54] SELF PROPELLED FEED APPARATUS
[76] Inventor: Harold Beckman, Jr., 609 E. 5th St., Stromsburg, Nebr. 68666
[22] Filed: June 16, 1975
[21] Appl. No.: 587,046
[52] U.S. Cl. .......................................... 214/83.32
[51] Int. Cl.² .......................................... B60P 1/00
[58] Field of Search ..... 214/83.26, 83.32, 519–522; 180/19 S; 298/1 C, 7, 24; 296/15; 193/2 R, 4–6

[56] References Cited
UNITED STATES PATENTS

| | | | |
|---|---|---|---|
| 2,296,014 | 9/1942 | Benzel et al. | 214/522 |
| 2,405,727 | 8/1946 | Aaberg | 214/83.32 |
| 2,535,841 | 12/1950 | Cresci | 298/7 |
| 2,544,202 | 3/1951 | Warner | 214/83.32 |
| 3,370,666 | 2/1968 | Holtzclaw et al. | 180/19 S |
| 3,726,024 | 4/1973 | Erwin | 214/521 |
| 3,844,433 | 10/1974 | Laajala | 214/83.26 |

FOREIGN PATENTS OR APPLICATIONS 1,201,244  12/1959  France .................. 298/1 C Primary Examiner—Trygve M. Blix
Assistant Examiner—Jesus D. Sotelo
Attorney, Agent, or Firm—Henderson, Strom & Sturm

[57] ABSTRACT

A self propelled feed apparatus for supplying feed to a plurality of feed receptacles and including a conveying unit having a frame, a bin mounted on the frame, a plurality of wheels rotatably supporting the frame, an auger mounted in the bin for conveying feed, and an adjustable chute mounted on the frame for delivering feed from the auger to the feed receptacle; a propulsion and steering unit; and a power unit.

7 Claims, 4 Drawing Figures

SELF PROPELLED FEED APPARATUS

BACKGROUND OF THE INVENTION

The feeding of animals wherein a plurality of feed receptacles have to be filled and in particular the feeding of hogs in a farrowing house can be a complicated and time consuming project. A number of complicated structures for carrying feed and the like have been developed but these structures are extremely costly and not suitable for the feeder of a small number of animals and where the feed receptacles may be disposed over a large area; for example, two or three farrowing houses which are spaced apart. Some feeders to cover large areas and even in single farrowing structures have utilized gasoline operated equipment; however, the noise pollution and fire hazard cannot always be tolerated because of the stresses placed on the animal and, of course, the risk taken by the operator.

The use of automatic feeding equipment, such as conveyers to each receptacle is the oversupplying of one receptacle and the undersupplying of another as different animals eat at different rates. As one way of actually determining the quantity of feed required at each receptacle is by actual operation, an attendant is required and the disadvantage of a fully automatic system is apparent. Furthermore, if an animal is not eating or is not in good health, the personal observation of the attendant as feed is supplied can be extremely advantageous.

SUMMARY OF THE INVENTION

This invention relates to a self propelled feed apparatus for supplying feed to a plurality of feed receptacles. The apparatus comprises a conveying unit comprising a frame mounted on wheels, a bin mounted on the frame, an auger mounted in the bin for conveying feed therefrom and an adjustable chute for delivering feed from the auger to eight side of the apparatus; a propulsion and steering unit; and a power unit.

It is an object of this invention to provide an improved self propelled feed apparatus.

Another object of this invention is the provision of a self propelled feed apparatus which can be used to supply a plurality of feed receptacles located in a plurality of unrelated areas or located opposite each other wherein feed can be supplied on either side of the apparatus.

A further object of the invention is to provide a self propelled feed apparatus wherein the apparatus is fully automatic and requires substantially no effort on the part of the operator in the supplying of feed to a receptacle other than steering the apparatus, positioning the chute and manipulating the controls.

Yet another object of this invention is the provision of a self propelled feed apparatus which is economical of manufacture, simple and durable of construction, and extremely effective in use.

These objects and other features and advantages of this invention will become readily apparent upon reference to the following description when taken in conjunction with the accompanying drawing.

BRIEF DESCRIPTION OF THE DRAWINGS

In the drawings, as herein described, a preferred embodiment of the invention is illustrated; however, various modifications can be made thereto without departing from the true spirit and scope of the invention.

DESCRIPTION OF THE PREFERRED EMBODIMENT

Figure 1:
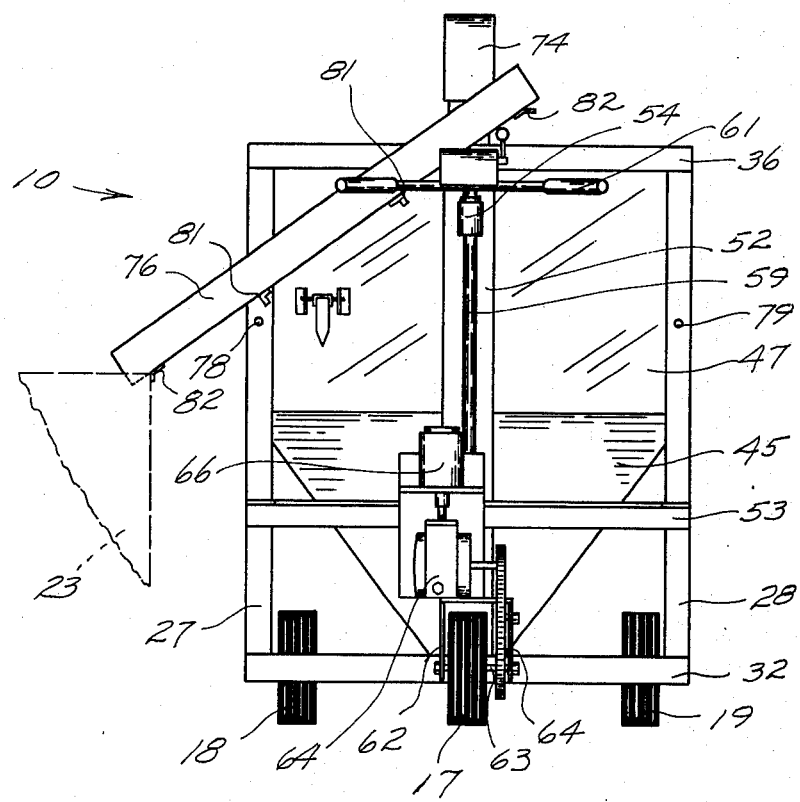
FIG. 1 is a perspective view of the self propelled feed apparatus of this invention.

The self propelled feed apparatus of this invention is depicted generally at 10 in FIG. 1. The apparatus 10 includes a conveying unit 11, a propulsion and steering unit 12 and a power unit 13.

Figure 3:
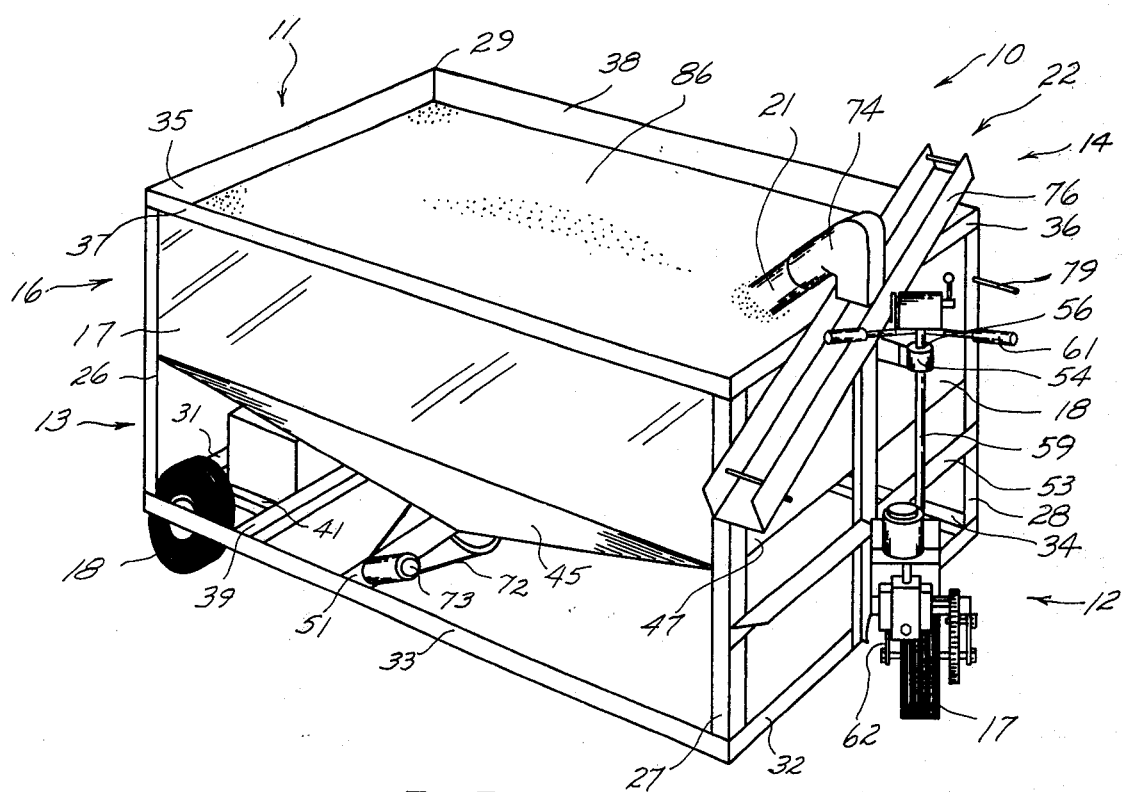
FIG. 3 is a front elevational view thereof.

Referring now to FIGS. 1 and 3, the conveying unit 11 includes a frame 14, a bin 16 mounted on the frame, a plurality of wheels 17–19 rotatably supporting the frame, an auger unit 21 mounted in the bin, and an adjustable chute 22 mounted on the frame 14 for delivering feed to a feed receptacle 23 (FIG. 1).

The frame 14 is formed from four vertically disposed, spaced legs 26–29 (FIGS. 1 and 4), interconnected at their ends by eight horizontally disposed members 31–38 thus forming an open rectangular shaped frame. Spaced rearwardly of the lower forward member 31 is a cross brace 39 and mounted between the lower forward member 31 and cross brace 39 is a rack 41. The rack is further supported by a pair of short braces 42 and 43 laterally secured between the cross brace 39 and the lower forward member 31. The pair of spaced front wheels 18 and 19 are journally mounted to a front axle 44 mounted between the lower side member 33 and 34 with each wheel disposed between the rack and the short braces 42 or 43.

Mounted in the rectangle frame 14 is the bin 16 (FIG. 2–4) having a base 45 in the form of an inverted pyramid, and four substantially verticle side walls 46–49 extending from the free edges of the base 45. The side walls 46–49 are secured to the vertical legs 26–27 and the upper horizontal members 35–38. A lateral brace 51 is disposed intermediate the lower horizontal members 31 and 32 and the apex of the base 45 is secured thereto.

Figure 2:
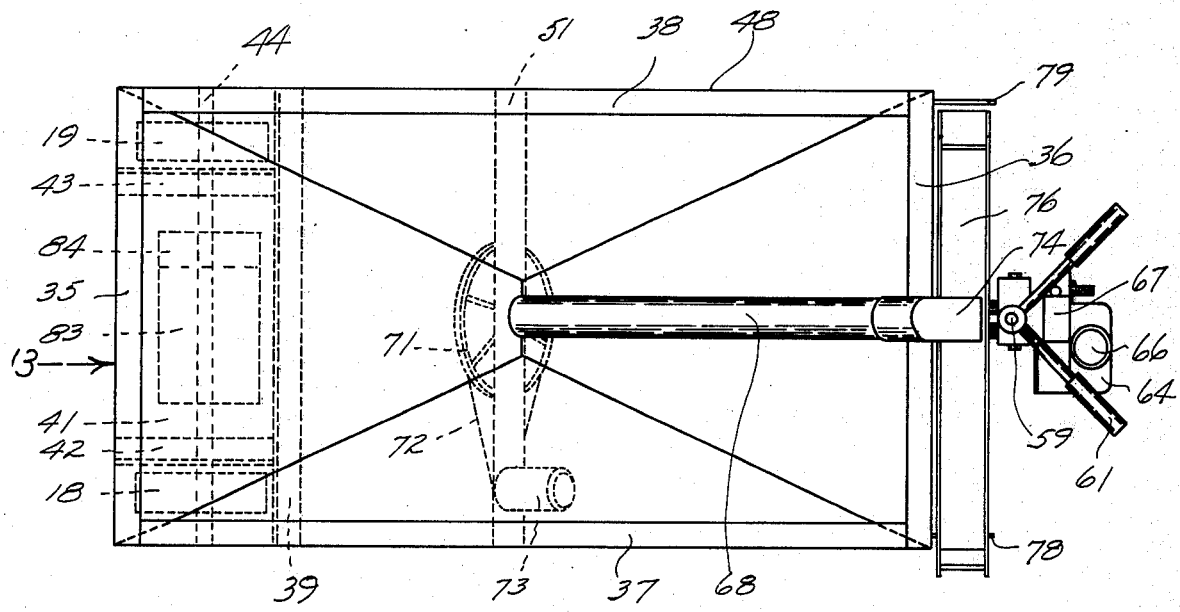
FIG. 2 is a side elevational view thereof.

Referring now to FIGS. 2 and 3, the propulsion and steering unit 12 is depicted as being mounted on the rear end of the frame 14. A vertical post 52 is secured intermediate the rear legs 27 and 28 between the rear upper and lower members 36 and 32. A horizontal bar 53 is secured intermediate the upper and lower members 36 and 32 between the rear legs 27 and 28. Projecting rearwardly of the post 52 is a horizontal first arm 54 having a passage 56 drilled vertically therethrough proximate the free end thereof. Parallel to the first arm 54 is a second arm 57 which is secured on one end to the bar 53. The second arm 57 has a passage 58 drilled therethrough in alignment with the passage 56. Journally mounted in the passages 56 and 58 is a vertically disposed steering column 59 having a V-shaped handle 61 secured to the upper end thereof and a wheel fork 62 secured to the lower end thereof. Mounted in the wheel fork 62 is the rear wheel 17, having an axle 63 rotatably secured to the fork and extending outwardly on one side thereof. A gear train 64 is operatively connected to the axle 63 and to a first electric motor 66. The first motor 66 and gear train 64 are mounted on the column 59 and a control mechanism 67 is mounted on the handle 61 and electrically connected to the motor 66.

Disposed in the bin 16 is the auger unit 21 having a tube 68 secured on one end to the apex of the base 45 and on the other end to the upper rear member 36. Rotatably mounted in the tube 68 is a helical auger 69, the lower end of which is axially connected to a pulley 71. The wheel 71 is rotatably mounted to the lateral brace 51 and belt-connected by a belt 72 to a second pulley mounted on the axle of a second electric motor 73. The second electric motor 73 is spaced from the tube 68 secured to the lateral brace 51 and electrically connected to the central mechanism 67. A generally U-shaped tube 74 is secured on one end to the top of the tube 68 with the free end thereof depending rearwardly of the bin 16.

Figure 4:
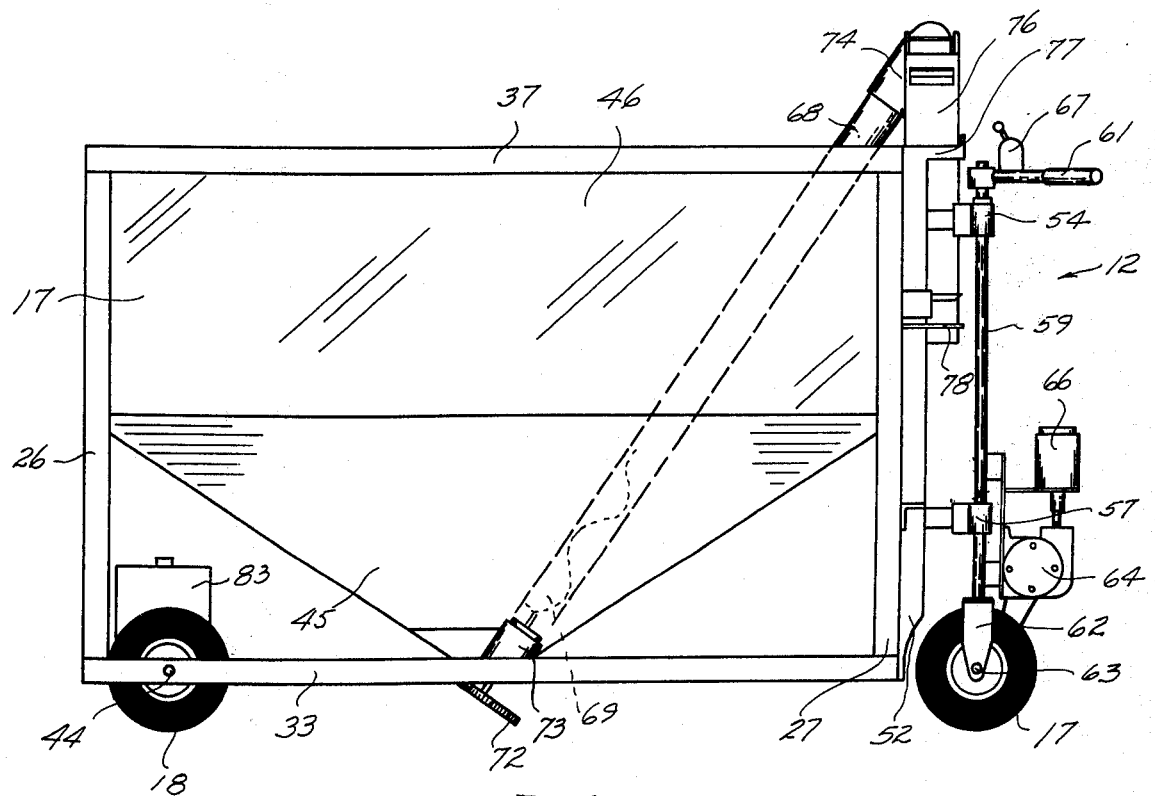
FIG. 4 is a top plan view thereof.

Movably disposed below the free end of the U-shaped tube is an open ended chute 76 (FIGS. 1 and 3). Secured to the vertical post 52 and projecting rearwardly thereof above the first arm 56 is an L-shaped arm 77 (FIG. 4). On each of the rear vertical legs 27 and 28 below the horizontal plane of the L-shaped arm 77 is a rearwardly projecting pad 78 or 79. Mounted on the bottom wall of the chute 76 and depending from each end thereof is a tab 81 or 82. The chute 76 is slidably and pivotally mounted in the L-shaped arm 77 and one of the tabs 81 or 82 is positioned to rest on one of the rods 78 or 79 or the receptacle 23 depending on the desired direction of flow of the feed deposited in the chute 76 by the auger 69.

The power unit 13 (FIG. 4) comprises a battery 83 mounted on the rack 41 and electrically connected to the first and second electric motors 66 and 73 and a battery charger 84 disposed along side the battery 83 and having electrical connections for wiring to the battery and to a source of power (not shown).

In operation, the bin 16 is filled from the top with feed or grain 86. The operator then can operate the propulsion and the steering unit to move the apparatus to the feed receptacles. The chute is positioned on the L-shaped arm 77 and rod 78 or 79 and the helical auger 69 is rotated to move the feed from the bin to the chute and then to the receptacle 23. During time of non-use the battery charger can be energized to recharge the battery.

There has therefore been described a self propelled feed apparatus which is substantially noiseless, does not distribute any pollutants and does not carry any flammable fluids for propulsion.

I claim:

1. A self propelled feed apparatus for supplying feed to a plurality of feed receptacles, said apparatus comprising:
   a frame;
   a plurality of wheels rotatably supporting said frame;
   an open topped bin for holding feed mounted in said frame;
   auger means mounted in said bin and operable to convey feed therefrom;
   adjustable chute means pivotally mounted on said frame and movable from a first position wherein feed from said auger will be conveyed by said chute means to one side of said frame, to a second position wherein the feed will be conveyed by said chute means to the other side of said frame; said chute means including an L-shaped arm secured to said frame and extending rearwardly thereof a pair of spaced pads secured outwardly of and below said arm to said frame and an open ended chute disposed on said arm and in a first position on one of said pads, said chute movable from said first position to a second position disposed on said arm and said other pad;
   a propulsion and steering means secured to said frame and operably connected to at least one of said wheels; power means mounted on said frame and operably connected to said auger means and to said propulsion and steering means.

2. A self propelled feed apparatus as defined in claim 1 wherein said chute means includes a pair of spaced tabs each said tab to engage one of said pads when said chute is in a predetermined position.

3. A self propelled feed apparatus as defined in claim 2 wherein said bin includes a base in the form of an inverted pyramid and four vertical side walls secured to and extending upwardly from the free edges of said base 4. A self propelled feed apparatus as defined in claim 3 wherein said auger means includes an open ended tube having one end disposed proximate the bottom of said bin and the other end disposed proximate the open end of said bin, a helical auger rotatably mounted in said tube and an open ended U-shaped tube having one end secured to said other end of said tube and the other end disposed outwardly of said bin over said chute means.

5. A self propelled feed apparatus as defined in claim 4 wherein said propulsion and steering means includes a pair of arms secured to said frame in vertical alignment, each said arm having a passage formed therethrough, a steering column journally mounted in said passages, a fork secured to the lower end of said column and having one of said wheels rotatably mounted therein, a handle bar secured to the other end of said column, an electric motor secured to said column, and a gear train connected to said one wheel and said motor for transmitting power from said motor to said wheel.

6. A self propelled feed apparatus as defined in claim 1 wherein said propulsion and steering means includes a pair of arms secured to said frame in vertical alignment, each said arm having a passage formed therethrough, a steering columm journally mounted in said passage, a fork secured to the lower end of said column and having one of said wheels rotatably mounted therein and a handle bar secured to the other end of said column.

7. A self propelled feed apparatus as defined in claim 6 wherein said propulsion and steering means further includes an electric motor secured to said column, and a gear train connected to said one wheel and said motor for transmitting power from said motor to said wheel.

* * * * *